Dec. 10, 1963
R. L. BUTZKO
3,113,345
APPARATUS FOR FORMING THERMOPLASTIC SHEET MATERIAL
Filed Aug. 24, 1961
3 Sheets-Sheet 1
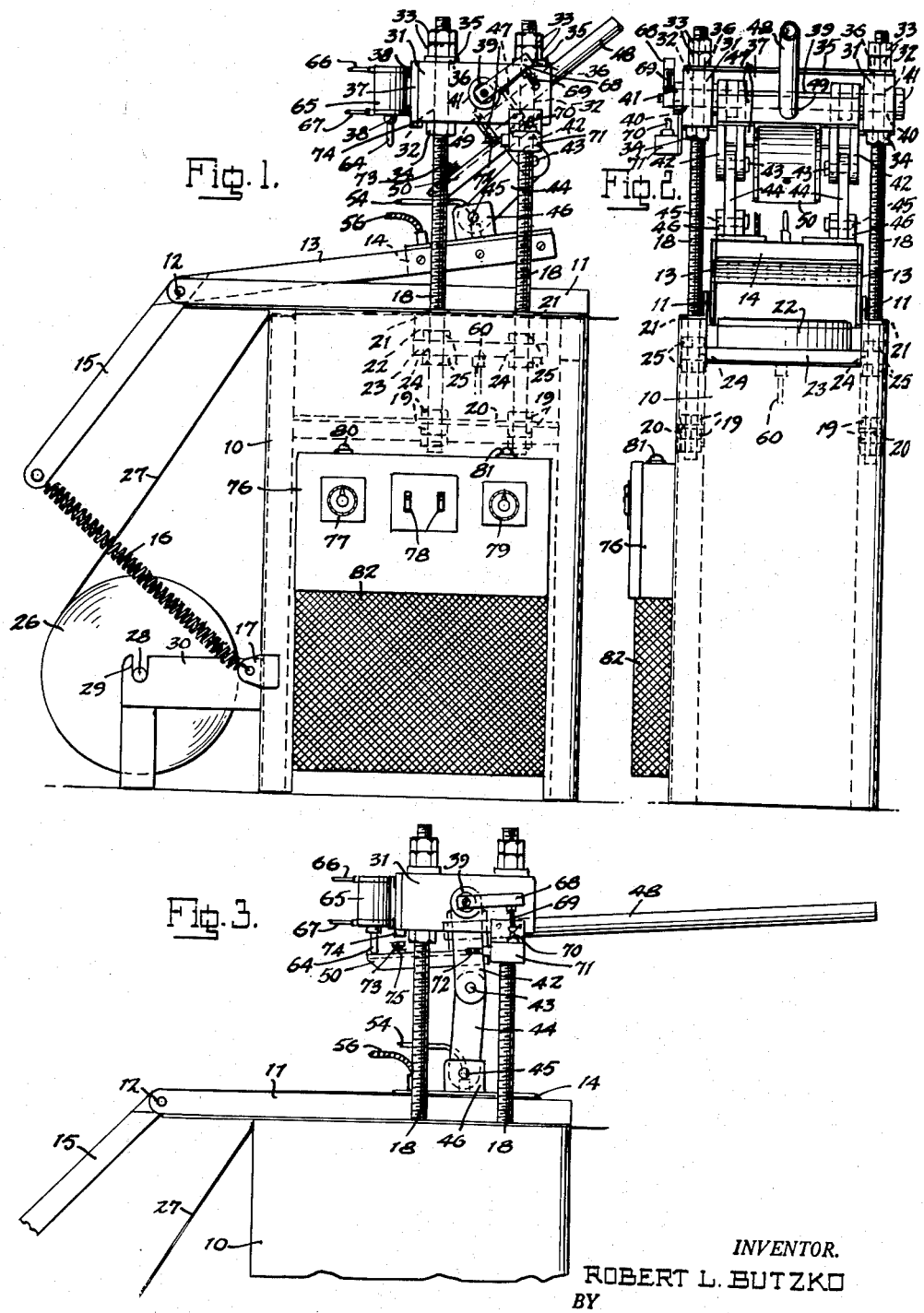
INVENTOR.
ROBERT L. BUTZKO
BY
ATTORNEY.

Dec. 10, 1963  R. L. BUTZKO  3,113,345
APPARATUS FOR FORMING THERMOPLASTIC SHEET MATERIAL
Filed Aug. 24, 1961
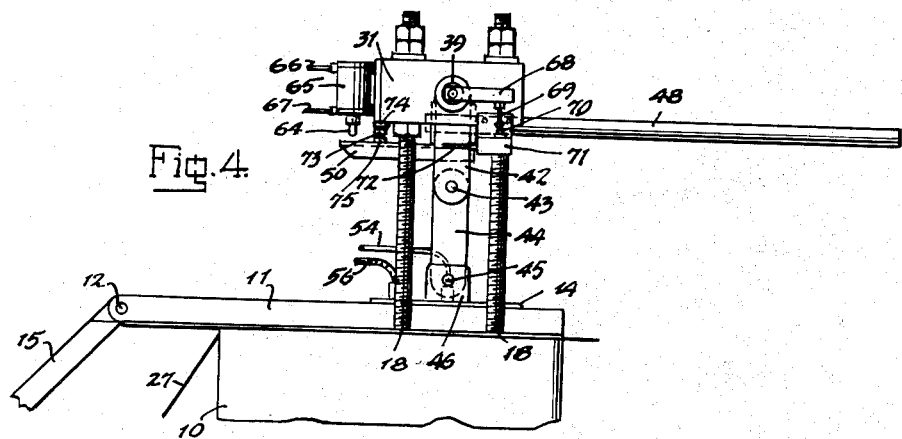
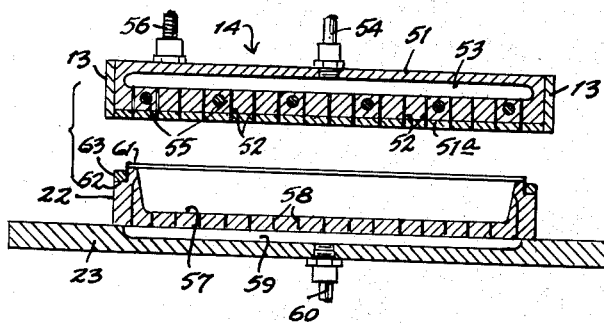
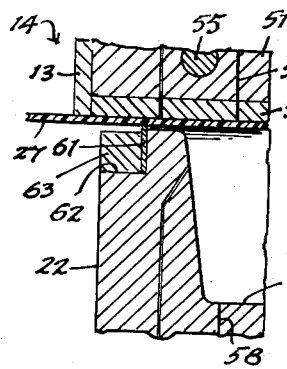
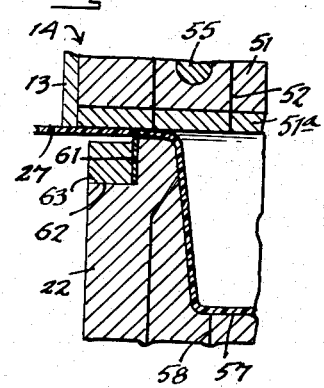
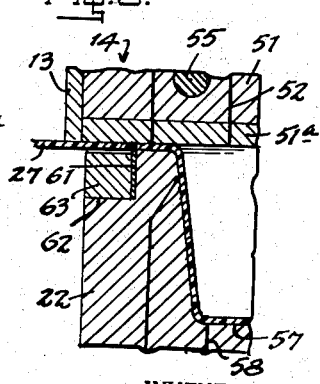
INVENTOR.
ROBERT L. BUTZKO
BY
ATTORNEY Dec. 10, 1963  R. L. BUTZKO  3,113,345
APPARATUS FOR FORMING THERMOPLASTIC SHEET MATERIAL
Filed Aug. 24, 1961  3 Sheets-Sheet 3
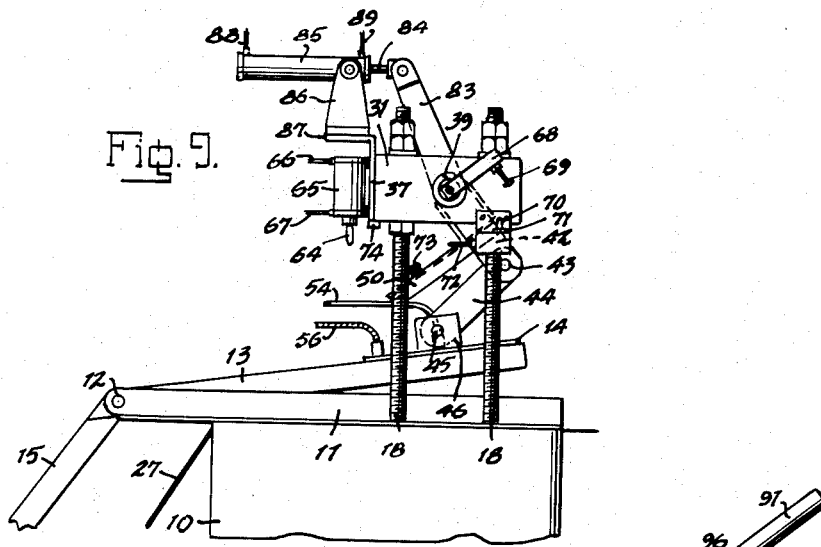
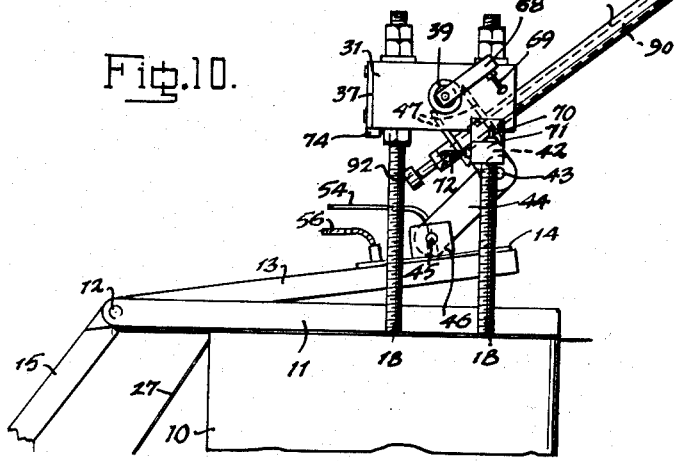
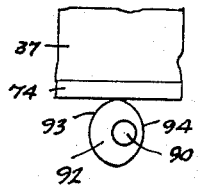
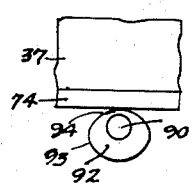
INVENTOR.
ROBERT L. BUTZKO
BY
ATTORNEY.

United States Patent Office 3,113,345
Patented Dec. 10, 1963

3,113,345
APPARATUS FOR FORMING THERMOPLASTIC SHEET MATERIAL
Robert L. Butzko, 94 Nash Lane, Bridgeport 5, Conn.
Filed Aug. 24, 1961, Ser. No. 133,638
5 Claims. (Cl. 18—19)

The present invention relates to apparatus for forming thermoplastic sheet material, and has for an object to provide apparatus of this character of compact, simple and inexpensive construction adapted for convenient and economical use in research laboratories in the experimental production of samples of formed products from thermoplastic film or sheet, in the relatively small scale commercial production of such products, and in other forming operations where large expensive automatic forming apparatus is not justified.

Another object is to provide a forming apparatus of combination pressure and vacuum type, by means of which the forming operation may be carried out either by use of pressure or vacuum or by a combination of pressure and vacuum. A further object is to provide improved means for applying mechanical pressure to the mold parts by which a maximum clamping and sealing action may be obtained with a minimum operating effort. Another object is to provide a forming apparatus which readily adapts itself to the provision of either manual or automatic operating means. A further object is to provide improved means for clamping the thermoplastic sheet and for severing the formed article from the sheet following the forming operation.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of the apparatus according to the invention, shown in open position;

FIG. 2 is a front elevation;

FIG. 3 is a side elevation partially broken away showing the apparatus in the operative position during the forming of the thermoplastic sheet;

FIG. 4 is a side elevation showing the apparatus in its final operating position to sever the formed article from the film or sheet;

FIG. 5 is a sectional view on an enlarged scale of a heater platen and cavity mold as employed in the apparatus;

FIG. 6 is a detailed sectional view on a further enlarged scale showing the first step in the forming operation where the thermoplastic sheet is clamped between the heater platen and the cavity mold;

FIG. 7 is a similar view showing the article formed in the cavity mold;

FIG. 8 is a similar view showing the formed article severed from the film or sheet;

FIG. 9 is a side elevation of a modified form of the apparatus adapted for automatic operation;

FIG. 10 is a side elevation of another modified form of the apparatus adapted for manual operation and manual control of the article severing means;

FIG. 11 is a detailed view on an enlarged scale of the cam means employed in the embodiment shown in FIG. 10 in one operative position during the forming operation; and FIG. 12 is a similar view showing the cam means in another operative position during the article severing operation.

Referring to the drawings, the apparatus for forming thermoplastic sheet material according to the exemplary embodiment of the invention illustrated in FIGS. 1–8 comprises a base 10 provided along the side edges of its upper side with a pair horizontal spaced parallel angle iron strips 11—11 which project rearwardly and pivotally support upon a pivot rod 12 a pair of forwardly extending arms 13, between the forward ends of which there is supported a heater platen 14. A pair of downwardly and rearwardly inclined lever arms 15 are secured as by welding to the rearward ends of the arms 13 and are respectively connected by springs 16 to brackets 17 secured at each side of the base 10, and which function as counterbalance means to normally move the heater platen 14 to its open position as seen in FIGS. 1 and 2, which open position is limited by stop means hereinafter more fully referred to.

At each side of the heater platen and supported in the base 10 there is provided a pair of vertically threaded posts 18—18 mounted at their lower ends by means of nuts 19 upon horizontal angle iron cross bars 20—20 secured within the base, clearance holes 21 being provided in the angle iron strips 11 for receiving the posts.

The cavity mold 22 is mounted upon a plate 23 which in turn is supported for vertical adjustment upon the pairs of posts 18, being provided for this purpose at each end with holes 24 engaged by the posts, nuts 25 being secured upon the posts above and below the plate to secure the plate in its position of vertical adjustment.

A roll 26 of the thermoplastic sheet material 27 is mounted by means of a spindle 28 in notches 29 of brackets 30 provided at the rear of the base 10 so that the sheet material may be conveniently drawn from the roll over the cavity mold 22 as clearly shown in FIG. 1.

A pair of bearing blocks 31 having vertical passages 32 are engaged upon the upper ends of the threaded posts 18, and secured in their position of vertical adjustment by nuts 33 and 34 secured upon the posts above and below the blocks. A pair of horizontal bracing strips 35 having holes 36 at their ends for receiving the posts are secured between the upper sides of the bearing blocks and the nuts 33 and extend transversely between the blocks. A vertically disposed plate 37 extends transversely between and is secured to the rearward sides of the blocks by screws 38 for the purpose of rigidly connecting the blocks and providing a support for certain parts of the apparatus, presently more fully referred to.

A transverse shaft 39 is rotatably engaged in bearing holes 40—40 in the pair of bearing blocks 31 and is positioned against axial movement by collars 41—41 secured upon the ends of the shaft. Upon the shaft adjacent the inner sides of the blocks there are secured the hub ends of a pair of forked crang levers 42, the outer ends of which are connected by pivot pins 43 to links 44 which in turn are connected by pivot pins 45 to brackets 46 secured to the upper side of the heater platen 14, the position of the brackets upon the heater platen being such that in the closed position, as seen in FIG. 4, with the toggle leverage provided by the crank levers and links vertically disposed, the axes of the pivot pins 45, the pivot pins 43, and the shaft 39 are in vertical line.

A pair of spanner plates 47 extend between the forked crank levers 42 and are rigidly secured to their forward and rearward sides as by welding so that the two forked crank levers form a rigid unit. A forwardly extending actuating handle 48 is engaged at its inner end in holes 49 in the spanner plates 47, and is rigidly secured thereto as by welding, this handle being of sufficient length to provide high leverage for the convenient manual operation of the toggle connection between the shaft 39 and the heater platen. The open position of the platen is limited as seen in FIG. 1 by engagement of the handle 48 with the forward bracing strip 35 under the action of the springs 16, the strength of these springs being such in relation to the weight of the heater platen that the latter is slightly overbalanced by the action of the springs to normally retain the parts in the open position while at the same time offering only slight resistance to the manual actuation of the toggle connection to move the heater platen to closed position.

An arm 50 preferably formed of channel iron is rigidly secured as by welding to the lower edges of the spanner plates 47 between the pair of forked crank levers 42 and projects rearwardly therefrom for the purpose of cooperating with stop means to limit the closed positions of the heater platen as will presently more fully appear.

As seen in FIG. 5 the heater platen 14 comprises a body member 51 provided at its under side with a heater plate 51a, the planar face surface of which is in communication through substantially equally distributed spaced passages 52 of very small diameter with a manifold channel 53 in the body member having a flexible pipe connection 54 with a source of vacuum or sub-atmospheric air as well as to a source of pressure or super-atmospheric air, the selective control of vacuum or pressure being provided by suitable timer actuated valve means (not shown) in well-known manner. The heater platen is heated in well-known manner by Calrods 55 suitably distributed in the body member 51 and to which electrical current is supplied through a flexible cable connection 56.

The cavity mold 22 is provided with a cavity 57 of suitable shape to produce the desired article, and is in communication through suitably disposed passages 58 with a manifold channel 59 in the supporting plate 23 in communication through a pipe connection 60 with a source of vacuum or sub-atmospheric air, as well as a source of pressure or super-atmospheric air, selectively controlled in well-known manner by timer actuated valve means.

At the upper side of the cavity mold and corresponding in shape to the outer edge of the article to be formed there is provided a cutter blade member 61, shown in the illustrated example as a circular band seated in an annular shouldered recess 62 and secured by a retaining ring 63. This blade is adapted, as will presently more fully appear, to sever the formed article from the thermoplastic sheet, and for this purpose the projection of its severing edge above the upper side of the rim surrounding the cavity 57 corresponds substantially to the thickness of the thermoplastic sheet.

In the operation of the apparatus the thermoplastic sheet material is first drawn forwardly over the cavity mold where it rests upon the upper edge of the blade member 61. Thereupon the heater platen is moved to its first closed position as seen in FIGS. 3 and 6 to clamp the material between the flat surface of the heater platen and the upper edge of the blade member and to cause the blade member to partially penetrate or indent the thermoplastic sheet. Simultaneously with this action the sheet is maintained in flat contact with the heater plate either by applying vacuum at the upper side or pressure at the lower side or a combination of vacuum and pressure at the upper and lower sides. This first closed position of the heater platen is determined by the engagement of the arm 50 with the projected plunger 64 of an air cylinder 65 mounted upon the transverse plate 37, air under pressure to retract and project the plunger being supplied through pipe connections 66 and 67 which extend to suitable timer controlled valve means (not shown).

The operating cycle of the apparatus is started as the handle moves to its first closed position by means of an arm 68 rigidly secured upon one end of the shaft 39 and provided with an adjustable control screw 69 which actuates the contact button 70 of a microswitch 71 connected by a cable 72 with suitable valve actuating timer means.

As soon as the thermoplastic sheet becomes heated to the desired molding temperature, the timer which is set to predetermine the heating time actuates the valve means to reverse the pressures upon the thermoplastic sheet to cause it to be moved through deformation into conforming relation with the cavity 57 of the cavity mold. Such movement may be produced either by pressure at the upper side or vacuum at the lower side or a combination of pressure and vacuum. During this forming operation it will be seen that the thermoplastic sheet is securely clamped and sealed at the point marking the outer periphery of the formed article by the partial penetration of the blade member as seen in FIG. 7.

When the article is formed and set through contact with the relatively cool cavity mold, it is severed from the thermoplastic sheet, and to this end the handle 40 is moved from the position as seen in FIG. 3 to the position as seen in FIG. 4, bringing the toggle leverage to its straight position and causing the blade member to fully penetrate the thermoplastic sheet and seat against the heater platen. This action is brought about by actuation of the air cylinder 65 to retract the plunger 64 to the position as seen in FIG. 4, allowing an adjustable stop member 73 carried by the arm 50 to move into an engagement with a stop bar 74 secured as by welding to the lower edge of the transverse plate 37. The stop member 73 is preferably in the form of a headed screw threaded into the arm 50 and provided with a lock nut 75 to fix its position of adjustment. The arrangement of the toggle leverage is such that final lowering movement of the heater platen to sever the formed article is of a very small order compared to the angular movement of the handle 48. Upon raising the heater platen at the completion of the operating cycle the formed article may be subjected to air pressure at the under side to assist in its removal from the mold.

As seen in FIGS. 1 and 2 the base 10 is provided at one side with a suitable control cabinet 76 provided with a temperature control unit 77, on-and-off switches 78, a timer control unit 79, and suitable pilot lights 80 and 81. Suitable vacuum and pressure units are housed within the base and are accessible through a removable screen guard 82. Further detail illustration and description of the control means and the connection of the cables, pipes and valves thereto is not deemed necessary as the practice in this respect is well known.

In FIG. 9 there is shown a modification in which the toggle leverage comprising the shaft 39, the crank lever 42 and the link 44 is adapted to be power operated. To this end a lever 83 is secured upon the shaft 39 and is pivotally connected to the piston rod 84 of an air cylinder 85 pivotally mounted upon a bracket 86 supported upon a right angle shelf extension 87 of the transverse plate 37. The cylinder is provided with flexible pipe connections 88 and 99 extending to a source of high pressure air provided with timer controlled valve means for projecting and retracting the piston rod to impart closing and opening movement to the platen. The measure ratio between the air cylinder 85 and the air cylinder 65 is such that the holding pressure of the plunger 64 in its projected position is greater in the closing pressure of the cylinder 85, so that the platen is limited in its initial closing movement to the position as shown in FIGS. 6 and 7 where the cutter blade 61 partially penetrates the thermoplastic sheet 27, full closing movement to sever the thermoplastic sheet being permitted upon the timer controlled retraction of the plunger 64.

In FIG. 10 there is shown a further modification adapted for full manual control of the platen closing operation. The manually operable handle 48a is of tubular form and rotatably supports a shaft 90 having a rotatable hand grip 91 secured upon its outer end and a cam 92 secured upon its inner end, the cam being provided with a high part 93 and a low part 94. A stop pin 95 secured to the shaft 88 moves in a limit slot 96 provided in the tubular handle 48a to limit the rotation of the hand grip 91. In swinging the handle downwardly to bring the platen into its initial closed position the cam is in position so that its high part 93 contacts the stop bar 74, thus limiting the movement of the platen to the position as seen in FIGS. 6 and 7. Upon completion of the forming operation the hand grip 91 is rotated to bring the low part 94 of the cam into engagement with the stop bar 74 as seen in FIG. 2, whereupon the handle 48a is permitted to move downwardly to its full closing position to bring the platen into the position as seen in FIG. 8 where the blade member 61 fully penetrates the thermoplastic sheet and severs the formed article therefrom.

What is claimed is:

1. Apparatus for forming thermoplastic sheet material, comprising a forming mold, a heater platen, cutter blade means carried by said mold having a continuous outline shape defining the peripheral outline of the article to be formed therein and projecting therefrom a distance at least equal to the thickness of the thermoplastic sheet to be formed, means for bringing said mold and platen into and out of closed relation with the thermoplastic sheet between them spanning said cutter blade means and having a margin entirely surrounding said cutter blade means, means for limiting the closed relation to a point at which said thermoplastic sheet is clamped between said platen and said blade means without full penetration of said sheet by said blade means, means for applying differential air pressures to said sheet to successively hold it in contact with said heater platen and to form it in a heated plastic state into conformity with said mold, and means for rendering said limit means inoperative to permit full closing movement and full penetration of said sheet by said blade means to sever a formed article from said sheet.

2. The invention as defined in claim 1, further characterized in that said limit means comprises a fluid pressure unit having a plunger adapted in a projected position to limit said closed relation to said point at which said thermoplastic sheet is clamped between said platen and said blade means, and in a retracted position to permit said full closing movement.

3. The invention as defined in claim 1, further characterized by manually movable limit means adapted in one position to limit said closed relation to said point at which said thermoplastic sheet is clamped between said platen and said blade means, and in another position to permit said full closing movement.

4. Apparatus for forming thermoplastic sheet material, comprising a forming mold, a heater platen, cutter blade means carried by said mold having a continuous outline shape defining the peripheral outline of the article to be formed therein and projecting therefrom a distance at least equal to the thickness of the thermoplastic sheet to be formed, means for bringing said mold and platen into and out of closed relation with the thermoplastic sheet between them spanning said cutter blade means and having a margin entirely surrounding said cutter blade means, means for limiting the closed relation to a point at which said thermoplastic sheet is clamped between said platen and said blade means with partial penetration of said sheet by said blade means, means for applying differential air pressures to said sheet to successively hold it in contact with said heater platen and to form it in a heated plastic state into conformity with said mold, and means for rendering said limit means inoperative to permit full closing movement and full penetration of said sheet by said blade means to sever a formed article from said sheet.

5. Apparatus for forming thermoplastic sheet material, comprising a base, a forming mold carried by said base, a heater platen, support means for said heater platen pivotally mounted on said base for bringing said platen into and out of closed relation with said mold, cutter blade means carried by said mold having a continuous outline shape defining the peripheral outline of the article to be formed therein and projecting therefrom a distance at least equal to the thickness of the thermoplastic sheet to be formed, a transverse shaft mounted on said base in line with said platen and mold, toggle leverage means connected between said shaft and said platen, means for imparting movement to said toggle leverage means to move said platen into and out of closed relation with said mold with the thermoplastic sheet between them spanning said cutter blade means and having a margin entirely surrounding said cutter blade means, means for limiting the closed relation to a point at which said thermoplastic sheet is clamped between said platen and said blade means without full penetration of said sheet by said blade means, means for applying differential air pressures to said sheet to successively hold it in contact with said heater platen and to form it in a heated plastic state into conformity with said mold, and means for rendering said limit means inoperative to permit full closing movement and full penetration of said sheet by said blade means to sever a formed article from said sheet.

References Cited in the file of this patent

UNITED STATES PATENTS

| | | |
|---|---|---|
| 1,904,268 | Bronson | Apr. 18, 1933 |
| 2,691,797 | Bertleff et al. | Oct. 19, 1954 |
| 2,814,074 | Butzko | Nov. 26, 1957 |
| 2,836,852 | Butzko | June 3, 1958 |